US009592694B2

(12) United States Patent
Clayton et al.

(10) Patent No.: US 9,592,694 B2
(45) Date of Patent: Mar. 14, 2017

(54) PRESSURE SENSITIVE COATING FOR IMAGE FORMING

(71) Applicant: Chromatic Technologies, Inc., Colorado Springs, CO (US)

(72) Inventors: Terrill Scott Clayton, Colorado Springs, CO (US); Timothy J. Owen, Colorado Springs, CO (US); Patrick Edson, Denver, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 14/804,210

(22) Filed: Jul. 20, 2015

(65) Prior Publication Data

US 2015/0321496 A1    Nov. 12, 2015

Related U.S. Application Data

(63) Continuation of application No. 14/228,174, filed on Mar. 27, 2014, now Pat. No. 9,085,192, which is a
(Continued)

(51) Int. Cl.
| | |
|---|---|
| *B41M 5/165* | (2006.01) |
| *B41M 5/28* | (2006.01) |
| *C09J 7/04* | (2006.01) |
| *B41M 5/136* | (2006.01) |
| *B41M 5/323* | (2006.01) |

(Continued)

(52) U.S. Cl.
CPC ............ *B41M 5/287* (2013.01); *B41M 5/136* (2013.01); *B41M 5/165* (2013.01); *B41M 5/323* (2013.01); *B41M 5/337* (2013.01); *C09J 7/0207* (2013.01); *C09J 7/0296* (2013.01); *C09J 7/045* (2013.01); *G01D 7/005* (2013.01); *C08K 5/0041* (2013.01); *C08K 9/10* (2013.01); *C09J 2205/102* (2013.01); *C09J 2205/106* (2013.01);
(Continued)

(58) Field of Classification Search
CPC .... B41M 5/165; B41M 5/287; C09J 2205/11; C01J 2205/11
USPC .................................................. 503/200–227
See application file for complete search history.

(56) References Cited

U.S. PATENT DOCUMENTS

| | | |
|---|---|---|
| 4,720,301 A | 1/1988 | Kito et al. |
| 5,053,309 A | 10/1991 | Sanders et al. |
| (Continued) | | |

FOREIGN PATENT DOCUMENTS

| | | |
|---|---|---|
| CN | 202463433 | 10/2012 |
| EP | 0506452 | 9/1992 |
| (Continued) | | |

OTHER PUBLICATIONS

U.S. Appl. No. 61/605,714, filed Mar. 1, 2012.

*Primary Examiner* — Bruce H Hess
(74) *Attorney, Agent, or Firm* — Craig R. Miles; CR Miles P.C.

(57) ABSTRACT

A microencapsulated pigment including a leuco dye system is incorporated as one or more layers in a roll of adhesive tape. The tape is applied and may be rubbed by hand or another object to induce a color change. The change may serve as an indicator that the tape is well adhered for masking purposes in a painting operation, or to present a design where only selected portions of the tape are rubbed to induce the color change. The microencapsulated pigment may be constructed so that the color change is irreversible or reversible.

16 Claims, 5 Drawing Sheets

Related U.S. Application Data continuation-in-part of application No. PCT/US2013/028555, filed on Mar. 1, 2013, and a continuation-in-part of application No. 13/752,056, filed on Jan. 28, 2013, now Pat. No. 8,921,264.

(60) Provisional application No. 61/605,714, filed on Mar. 1, 2012.

(51) Int. Cl.
*B41M 5/337* (2006.01)
*G01D 7/00* (2006.01)
*C09J 7/02* (2006.01)
*C08K 5/00* (2006.01)
*C08K 9/10* (2006.01)

(52) U.S. Cl.
CPC .......... *C09J 2205/11* (2013.01); *Y10T 156/10* (2015.01); *Y10T 428/25* (2015.01)

(56) References Cited

U.S. PATENT DOCUMENTS

| | | |
|---|---|---|
| 5,219,625 A | 6/1993 | Matsunami et al. |
| 5,441,418 A | 8/1995 | Brown et al. |
| 5,514,635 A | 5/1996 | Filo |
| 5,558,700 A | 9/1996 | Shibahashi et al. |
| 5,591,255 A | 1/1997 | Small |
| 5,721,059 A | 2/1998 | Kito et al. |
| 5,785,746 A | 7/1998 | Kito et al. |
| 5,786,838 A | 7/1998 | Steinhauser et al. |
| 5,805,245 A | 9/1998 | Davis et al. |
| 5,997,849 A | 12/1999 | Small et al. |
| 6,139,779 A | 10/2000 | Small et al. |
| 6,346,024 B1 | 2/2002 | Engel |
| 6,494,950 B1 | 12/2002 | Fujita et al. |
| 6,620,571 B2 | 9/2003 | Katampe et al. |
| 7,494,537 B2 | 2/2009 | Ono et al. |
| 8,912,119 B2 | 12/2014 | Tynan et al. |
| 8,921,264 B2 | 12/2014 | Clayton et al. |
| 9,085,192 B2 | 7/2015 | Clayton et al. |
| 2007/0116910 A1 | 5/2007 | Polykarpov et al. |

FOREIGN PATENT DOCUMENTS

| | | |
|---|---|---|
| JP | S57203588 | 12/1982 |
| WO | WO 2013/130939 | 9/2013 |

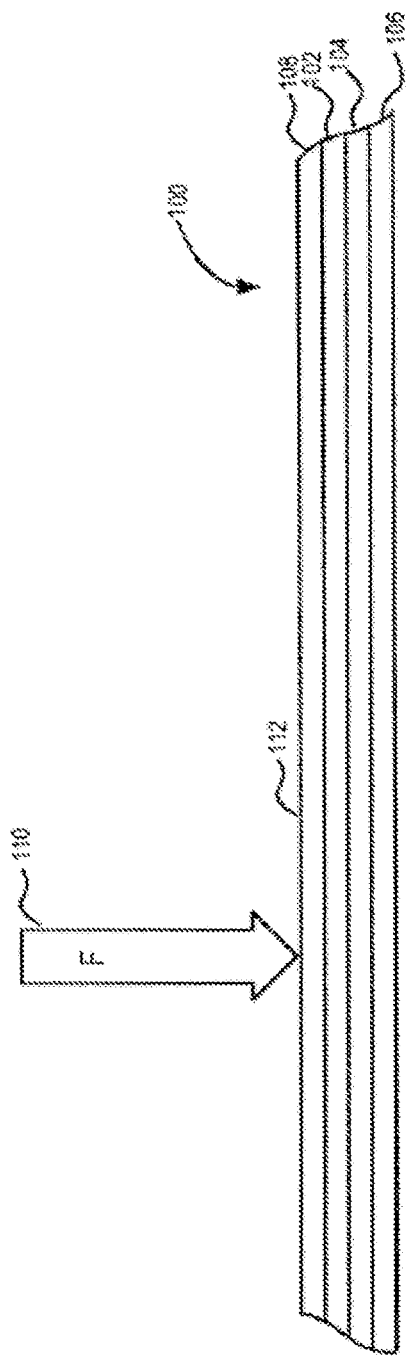
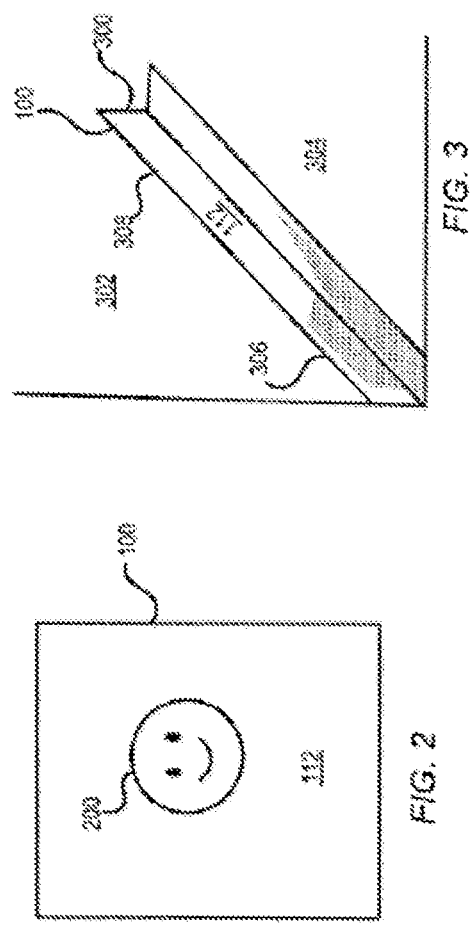

PRESSURE SENSITIVE COATING FOR IMAGE FORMING

RELATED APPLICATIONS

This United States Patent Application is a continuation of U.S. patent application Ser. No. 14/228,174, filed Mar. 27, 2014, now U.S. Pat. No. 9,085,192, issued Jul. 21, 2015, which is a continuation-in-part of International Patent Cooperation Treaty Patent Application No. PCT/US13/28555, filed Mar. 1, 2013, and which is also a continuation-in-part of U.S. patent application Ser. No. 13/752,056, filed Jan. 28, 2013, now U.S. Pat. No. 8,921,264, issued Dec. 30, 2014, which claims the benefit of U.S. Provisional Patent Application No. 61/605,714, filed Mar. 1, 2012, each hereby incorporated by reference herein.

BACKGROUND

Carbonless paper was developed in the 1950's (NCR) to satisfy the need of being able to produce a duplicate image of an original document. The image is developed when pressure is applied to an original top surface. The pressure generated by the tip of a pen crushes capsules containing a leuco dye releasing the dye which is in solution in one of a number of potential solvents. The dye solution then can react with an unencapsulated developer chemical such as an acidified clay or phenolic compound. The dye becomes protonated and develops a permanent color. Various patents have been granted for microencapsulation processes and coating processes to manufacture carbonless paper. The extent of the use of carbonless paper has been for producing duplicates of original documents.

Pressure-rupturable microcapsules may be formed in any suitable manner. For example, capsules formed from coacervation of gelatin, polycondensation of urea-formaldehyde, interfacial cross-linking, or hydrolysis of isoclyanatoamidine products may be used. The microencapsulation technology is shown generally, by way of example, in U.S. Pat. No. 4,317,743 issued to Chang et al., U.S. Pat. No. 6,620,571 issued to Katampe et al., as well as U.S. Pat. No. 6,162,485 issued to Chang, all of which are incorporated by reference to the same extent as though fully replicated herein.

Activities for children may include drawing by various means including crayons, water colors, or finger painting. While the children certainly enjoy these activities, this can necessitate the use of special precautions to prevent the children from making an undue mess. For example, the activities may be limited to a special area and frequently also close caregiver supervision is required.

Chemicals that change color over a range of temperatures are known as thermochromic systems. Thermochromic chemicals can be manufactured to have a color change that is reversible or irreversible. U.S. Pat. No. 5,591,255, entitled "Thermochromic Ink Formulations, Nail Lacquer and Methods of Use", issued Jan. 7, 1997 to Small et al., discloses methods of producing thermochromic coating formulations without ingredients known to be harmful to thermochromic inks. The use of distilled water as a fountain solution for off-set printing using thermochromic ink is also disclosed.

Thermochromic systems use colorants that are either liquid crystals or leuco dyes. Liquid crystals are used less frequently than leuco dyes because they are very difficult to work with and require highly specialized printing and handling techniques. Thermochromic pigments are a system of interacting parts. Leuco dyes act as colorants, while weak organic acids act as color developers. Solvents or waxes variably interact with the leuco dyes according to the temperature of the system. As is known in the art, thermochromic systems are microencapsulated in a protective coating to protect the contents from undesired effects from the environment. Each microcapsule is self-contained, having all of the components of the entire system that are required for the color change. The components of the system interact with one another differently at different temperatures. Generally, the system is ordered and colored below a temperature corresponding to the full color point. The system becomes increasingly unordered and starts to lose its color at a temperature corresponding to an activation temperature.

Below the activation temperature, the system is usually colored. Above the activation temperature the system is usually clear or lightly colored. The activation temperature corresponds to a range of temperatures at which the transition is taking place between the full color point and the clearing point. Generally, the activation temperature is the temperature at which the human eye can perceive that the system is starting to lose color, or alternatively, starting to gain color. Presently, thermochromic systems are designed to have activation temperatures over a broad range, from about −20° C. to about 80° C. or more. With heating, the system becomes increasingly unordered and continues to lose color until it reaches a level of disorder at a temperature corresponding to a clearing point. At the clearing point, the system lacks any recognizable color.

In this manner, thermochromic pigments change from a specific color to clear upon the application of thermal energy or heat in a thermally-driven cycle exhibiting well-known hysteresis behavior. Thermochromic pigments come in a variety of colors. When applied to a substrate, such as paper, the pigment exhibits the color of the dye at the core of the microcapsules. In one example, when heat is applied generally in the range of 30 to 32° C., the ink changes from the color of the pigment to clear. When the substrate is allowed to return to a temperature under approximately 30° C., the ink returns to the original color of the pigment.

U.S. Pat. No. 5,785,746, entitled "Preparation Method for Shear-Thinning Water-Based Ball-Point Pen Inks Compositions and Ball-Point Pens Employing the Same," issued Jul. 28, 1998 to Kito et al., discloses reversible thermochromic microcapsular pigment mixed in an ink composition. The microcapsules have concavities to moderate stress resulting from an external force during use in a ball-point pen.

U.S. Pat. No. 5,805,245, entitled "Multilayered Dispersed Thermochromic Liquid Crystal," issued Sep. 8, 1998 to Davis, discloses a thermochromic substance, applied to inert films in stacked layers with a non-invasive barrier between each thermochromic substance. The thermochromic substance in each layer responds in a different temperature range so that as the temperature changes, each layer repeats a similar sequence of colors. The substrate is a water-based acrylic copolymer formulation coated or permeated with a black pigment. A transparent inert film or non-invasive barrier serves as a protective coating for the thermochromic film and as a support for the next layer of the thermochromic substance.

Specific thermochromic coating formulations are known in the art. See, for example, U.S. Pat. Nos. 4,720,301, 5,219,625 5,558,700, 5,591,255, 5,997,849, 6,139,779, 6,494,950 and 7,494,537, all of which are expressly incorporated herein by reference. These thermochromic coatings are known to use various components in their formulations, and are generally reversible in their color change. Thermochromic; pigments for use in these coatings are commercially available in various colors, with various activation temperatures, clearing points and full color points. Thermochromic coatings may be printed by offset litho, dry offset, letterpress, gravure, flexo and screen processes, among other techniques.

SUMMARY

The presently disclosed instrumentalities advance the art by providing a roll of adhesive tape that contains microencapulated pigment intermixed with one or more layers. This may be used to facilitate painting operations where a thermochromic color change confirms that the tape is well adhered for masking purposes. Alternatively, the tape may be constructed so that heat or pressure may be used to draw a design on select areas of the tape.

According to one embodiment, an elongate substrate is formed in a roll. The substrate may be, for example, crepe paper or plastic that presents a first face and a second face remote from the first face. An adhesive layer covers the first face of the substrate. A microencapsulated pigment is intermixed with at least one member of the group consisting of the adhesive layer, a first coating bonded directly to the first face of the substrate and which is interposed between the substrate and the adhesive layer; and a second coating bonded directly to the second face of the substrate. The microencapsulated pigment is responsive to at least one of temperature and pressure to provide a marking that is visible from a perspective encompassing the second face of the substrate.

In one aspect, the roll of tape may be such that the microencapsulated pigment may be made of frangible capsules as a mixture of different microcapsules respectively incorporating a leuco dye and a developer. The microencapsulated thermochromic pigment responds to pressure that ruptures the microcapsules to provide a pressure-chromic color change by rupturing the capsules. This type of color change is permanent or irreversible.

In one aspect, the roll of tape may be such that the microencapsulated pigment may be made of capsules that incorporate a leuco dye system with thermochromic functionality. This microencapsulated pigment responds to temperature to provide a thermochromic color change by rupturing the capsules. This type of color change may be reversible upon cooling of the tape, for example, by refrigeration or by the applicant of ice.

Specific applications include adhesive tape that permanently changes color as it is pressed into position, for example, where the color change confirms to a painter that masking tape is actually adhering to an intended position. Another example is interactive decorative use where schoolchildren place adhesive tape or film on a desk or textbook and 'finger paint' designs.

BRIEF DESCRIPTION OF THE DRAWINGS

FIG. 1 shows a substrate that supports one or more layers that contain a mixture of microencapsulated components of a leuco dye system where these components are released for a color-producing interaction upon rupture of the microcapsule walls.

FIG. 2 shows an image that may be produced by the rupturing of frangible microcapsule walls.

FIG. 3 shows masking tape where the rupture of frangible microcapsule walls produces a color change which assures the tape is adhering well for use in the painting of a wall or floor.

DETAILED DESCRIPTION

Figure 4A:
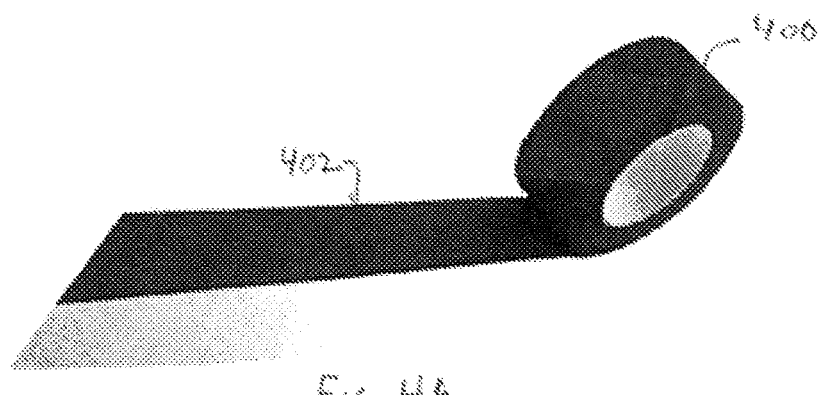
FIGS. 4A, 4B and 4C show a roll of tape wherein the roll of FIG. 4A is unmarked, that of FIG. 4B carries a permanent or non-reversible marking, and that of FIG. 4C carries a temporary or nonreversible marking.

In accordance with the instrumentalities described herein, microcapsules containing amine-formaldehyde shell walls are prepared by emulsifying an oily material internal phase in an aqueous medium, and subsequently forming amine-formaldehyde walls around the internal phase by in situ polycondensation. A hydrophilic polymer is optionally added to at least one of the internal phase or the continuous aqueous phase. The hydrophilic polymer becomes incorporated into the microcapsule wall. The hydrophilic polymer may be pectin (methylated polygalacturonic acid) or a synthetic hydrophilic polymer, such as a chemically modified gelatin. The hydrophilic polymer may be suitably added to the internal phase in an amount ranging from 0.01 to 10% by weight and more typically about 0.15 to 3% based on the monomer and also dependent on the color of the resultant batch.

The hydrophilic polymer is alternatively added to the continuous aqueous phase. The hydrophilic polymer can be dissolved in the continuous aqueous phase where it functions as a viscosity modifier and wall component. Incorporating the hydrophilic polymer into the continuous aqueous phase provides a process for increased control over the size of the resultant microcapsules. The increased aqueous phase viscosity leads to smaller size average capsules. The hydrophilic polymer also plasticizes the microcapsule wall thereby providing better stability and control of the dye release mechanism. The amount of hydrophilic polymer added to the continuous aqueous phase varies with the nature of the hydrophilic polymer and the nature and amount of the other materials used in the composition. The amount is limited to an amount that does not interfere with capsule rupture and reaction of the color former with the developer. The hydrophilic polymer is preferably incorporated in the aqueous phase in an amount of about 0.01 to 10% by weight based on monomer used in the composition and more typically in an amount of 0.15 to 3%.

Useful hydrophilic polymers include synthetic and natural hydrophilic polymers. Representative examples of such hydrophilic polymers include gum arabic, gelatin, gelatin derivatives such as phthalated gelatins, cellulose derivatives such as hydroxy cellulose, carboxymethyl cellulose and the like, soluble starches such as dextrin and combinations thereof. A preferred class of hydrophilic polymers is chemically modified gelatin. Specific examples of chemically modified gelatins include Gelita$^{TM}$ polymers from Kind & Knox and, more particularly, Gelita™ 8104, 8105, 8106 and 8107. These polymers are modified from Type A or Type B gelatin.

In capsule manufacture, as aqueous phase serves as the continuous phase of an oil-in-water emulsion in which the oily core materials phase is dispersed. The aqueous phase includes agents known as emulsifiers and system modifiers to control the size and uniformity of the microcapsules and to produce individual mononuclear capsules in preference to clusters of microcapsules. Useful emulsifiers and system modifiers are well known in the art. Their selection will depend on the type of microencapsulation process used and the nature of the wall formers. For making melamine-formaldehyde microcapsules a combination of methylated polygalacturonic acid and sulfonated polystyrenes may be used. The polygalacturonic acid acts as both a stabilizer and a viscosity modifier for the aqueous phase, and the sulfonated polystyrenes aid in emulsification.

Typical examples of useful sulfonated polystyrenes are Versa TL500 and Versa TL503, products of National Starch Co. Useful sulfonated polystyrenes are generally characterized by a sulfonation degree of over 85% and preferably over 95%. The molecular weight of the sulfonated polystyrene is preferably greater than 100,000 and more preferably about 500,000-1,000,000 but other molecular weights can also be used. The sulfonated polystyrene is usually added to the aqueous phase in an amount of about 1 to 6% by weight. The quality of this product has also been found to vary with the method by which it is manufactured such that certain sulfonated polystyrenes are better than others.

Dye capsules and developer capsules are manufactured separately and subsequently combined as a mixture. The mixture preferably contains a ratio of dye:developer capsules ranging from 1:1 to 1:20 by weight to achieve a pressure sensitive coating of desirable color with minimal residual color. The following examples teach by way of example and not by limitation.

EXAMPLE 1

Microencapsulation with Gelatin in the Oil Phase

1. Into a stainless steel beaker, 110 g water and 4.6 g dry sodium salt of polyvinylbenzenesulfonic acid (VERSA) are weighed.
2. The beaker is clamped in place on a hot plate under an overhead mixer. A six-bladed, 45° pitch, turbine impeller is used on the mixer.
3. After thoroughly mixing, 4.0 g pectin (polygalacturonic acid methyl ester) is slowly sifted into the beaker. This mixture is stirred for 2 hours at room temperature (800-1200 rpm).
4. The pH is adjusted to 6.0 with 2% sodium hydroxide.
5. The mixer is turned up to 3000 rpm and the internal phase is added over a period of 10-15 seconds. Emulsification is continued for 10 minutes at a temperature of 25°-30° C.
6. After 20 minutes, the mixing speed is reduced to 2000 rpm, and a solution of melamine-formaldehyde prepolymer is slowly added. This prepolymer is prepared by adding 6.5 g formaldehyde solution (37%) to a dispersion of 3.9 g melamine in 44 g water. After stirring at room temperature for 1 hour the pH is adjusted to 8.5 with 5% sodium carbonate and then heated to 62° C. until the solution becomes clear (30 minutes).
7. At the start of emulsification, the hot plate is turned up so heating continues during emulsification.
8. The pH is adjusted to 6.0, using 5% phosphoric acid. The beaker is then covered with foil and placed in a water bath to bring the temperature of the preparation to 75° C. When 75° C. is reached, the hot plate is adjusted to maintain this temperature for a two hour cure time during which the capsule walls are formed.
9. After curing, mixing speed is reduced to 1800 rpm, formaldehyde scavenger solution (7.7 g urea and 7.0 g water) is added and the solution cured another 40 minutes.
10. After 40 minutes hold time, turn down the mixer rpm to 1100 and adjust the pH to 9.5 using a 20% NaOH solution and then allow to stir at 500 rpm overnight at room temperature.

The materials forming the internal phase are added in step 5 above, and the materials forming the aqueous phase are added in step 6. The total capsule weight preferably comprises from 5% to 30% of a melamine formaldehyde polymer, or another polymer known to the art that is suitable for microencapsulation. Melamine resin Cas# 9003-08-1 is particularly preferred. The remainder of the capsule constituting 70% to 95% of the capsule weight is the internal phase where the internal phase is formulated either for use as a dye capsule or as a developer capsule. Any system of a leuco dye and developer may be used.

| Core Material | | Wt % |
|---|---|---|
| Dye Capsule: | | |
| Blue Dye | Cas# 69898-40-4 | 1-20% |
| Hexamoll Dinch | Cas# 166412-78-8 | 80-99% |
| Developer Capsule: | | |
| 4,4-Biphenol | Cas# 92-88-6 | 1-25% |
| Isopropyl myristate | Cas# 110-27-0 | 75-99% |
| Dye Capsule: | | |
| Green Dye | Cas# 34372-72-0 | 1-20% |
| Dioctyl phthalate | Cas# 117-84-0 | 80-99% |
| Developer Capsule: | | |
| 4,4-Biphenol | Cas# 92-88-6 | 1-25% |
| Diiso nonylphalate | 2855-12-0 | 75-99% |

EXAMPLE 2

Microencapsulation with Gelatin in the Aqueous Phase

Model Laboratory Capsule Preparation

1. Into a stainless steel beaker, 110 g water and 4.6 g dry sodium salt of polyvinylbenzenesulfonic acid (VERSA) are weighed.
2. The beaker is clamped in place on a hot plate under an overhead mixer. A six-bladed, 45° pitch, turbine impeller is used on the mixer.
3. After thoroughly mixing, 4.0 g pectin (polygalacturonic acid methyl ester) is slowly sifted into the beaker.
4. 0.25-5.0 g gelatin (pellets or solution thereof) is added to the beaker containing pectin/versa with continuous stirring. This mixture is stirred for 2 hours at room temperature (800-1200 rpm).
5. The pH is adjusted to 6.0 with 2% sodium hydroxide.
6. The mixer is turned up to 3000 rpm and the internal phase is added over a period of 10-15 seconds. Emulsification is continued for 10 minutes at from 25°-30° C.
7. At the start of emulsification, the hot plate is turned up so heating continues during emulsification.
8. After 20 minutes, the mixing speed is reduced to 2000 rpm, and a solution of melamine-formaldehyde prepolymer is slowly added. This prepolymer is prepared by adding 6.5 g formaldehyde solution (37%) to a dispersion of 3.9 g melamine in 44 g water. After stirring at room temperature for 1 hour the pH is adjusted to 8.5 with 5% sodium carbonate and then heated to 62° C. until the solution becomes clear (30 minutes).

9. The pH is adjusted to 6.0, using 5% phosphoric acid. The beaker is then covered with foil and placed in a water bath to bring the temperature of the preparation to 75° C. When 75° C. is reached, the hot plate is adjusted to maintain this temperature for a two hour cure time during which the capsule walls are formed.

10. After curing, mixing speed is reduced to 1800 rpm, formaldehyde scavenger solution (7.7 g urea and 7.0 g water) is added and the solution cured another 40 minutes.

11. After 40 minutes hold time, turn down the mixer rpm to 1100 and adjust the pH to 9.5 using a 20% NaOH solution and then allow to stir at 500 rpm overnight at room temperature.

The materials forming the internal phase are added in step 6 above, and the materials forming the aqueous phase are added in step 7. The total capsule weight preferably comprises from 5% to 30% of a melamine formaldehyde polymer, or another polymer known to the art that is suitable for microencapsulation. Melamine resin Cas# 9003-08-1 is particularly preferred. The remainder of the capsule constituting 70% to 95% of the capsule weight is the internal phase where the internal phase is formulated either for use as a dye capsule or as a developer capsule. Any system of a leuco dye and developer may be used.

| Core Material | | Wt % |
| --- | --- | --- |
| Dye Capsule: | | |
| Blue Dye | Cas# 69898-40-4 | 1-20% |
| Hexamoll Dinch | Cas# 166412-78-8 | 80-99% |
| Developer Capsule: | | |
| 4,4-Biphenol | Cas# 92-88-6 | 1-25% |
| Isopropyl myristate | Cas# 110-27-0 | 75-99% |
| Dye Capsule: | | |
| Green Dye | Cas# 34372-72-0 | 1-20% |
| Dioctyl phthalate | Cas# 117-84-0 | 80-99% |
| Developer Capsule: | | |
| 4,4-Biphenol | Cas# 92-88-6 | 1-25% |
| Diiso nonylphalate | 2855-12-0 | 75-99% |

A typical coating composition using the microcapsules described above can be coated onto a substrate, such as Mylar or another plastic. Use on paper or plastic used in the manufacture of adhesive tape is particularly preferred.

| Ingredient | Wt (g) | Wt %% |
| --- | --- | --- |
| Microcapsules | 4.94 g | 29% |
| Phenolic Resin (HRJ 4542 from Schenectady Chemical Co.) | 11.54 g | 68% |
| Polyvinyl alcohol (airvol grade 205 from Air Products Co.) | 0.26 g | 1.5% |
| Sequrez 755 (binder) | 0.26 g | 1.5% |

FIG. 1 shows a sheet material 100 that is provided with one or more coatings made from a mixture of frangible microcapsules as described above. A substrate 102 may be, for example, a flexible plastic or cellulosic sheet. A variety of options exist for applied coatings that contain a mixture of microcapsules. The microcapsules may be mixed into a liquid material and applied as layer 104 at the bottom of substrate 102. The layer 104 may be applied as a liquid that is then dried or cured to form a solid or gel material. An adhesive layer 106 is optionally included if it is desirable for the substrate 102 to adhere to other surfaces. If this is the case, then the layer 104 is optionally eliminated, as a commercially available adhesive may be modified by addition of the mixture of microcapsules such that color-forming occurs within the adhesive layer 106. Layer 108 is optionally included or eliminated, and may be a layer like layer 104, except one top-coating the substrate 102.

It will be appreciated that any system of commercially available leuco dye and developer materials may be used to produce pigments as described above in a range of colors. Color options include blue, red, green, black, magenta, orange, aqua, yellow, purple, etc. Color to color options may be green color that develops on yellow, purple color that develops on pink, red color that develops on yellow, etc.

A force 110 may be applied to top surface 112 for purposes of rupturing the frangible microcapsules. The force 110 may be applied manually using fingers or manually manipulated tools, such as a spatula or other implement. Where this occurs locally, by way of example, it is possible to drawn an image 200, as shown in FIG. 2, where the substrate 102 is a flexible sheet of plastic or cellulosic material. Where the substrate 102 is a masking tape 300 as shown in FIG. 3, the tape may be deployed at the intersection between a wall 302 and a floor 304. A color-developed area 306 indicates that the tape has been pressed sufficiently for adherence to the underlying floor 304 or wall 302, and an undeveloped area 308 indicates that the tape has been positioned but adherence is insufficient because the lack of developed color indicates the tape has not been pressed against the underlying floor 304 or wall 302.

Figure 4B:
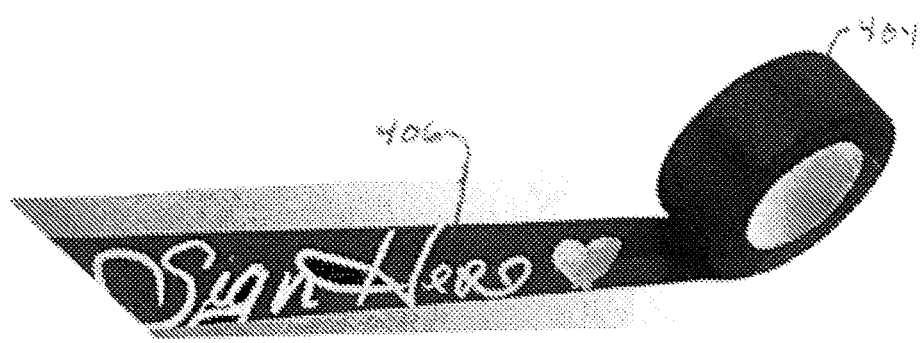

As shown in FIG. 4A, a roll of tape 400 that is prepared as described above may be unrolled to present an unmarked face 402. FIG. 4B shows roll 404 presenting a face 406 that has been marked by the use of pressure sufficient to create a design constituting the words "sign here." This marking on face 406 is permanent or non-reversible due to the frangible nature of the microcapsules in layers 104, 106 or 108 (shown in FIG. 1).

Figure 4C:
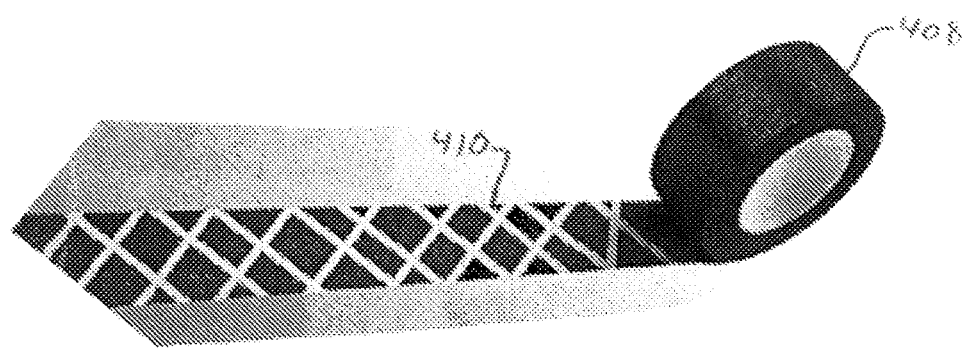

In an alternative embodiment of FIG. 4C, roll 408 presents a face 410 with a design, here shown as a cross-hatch design, that is nonpermanent or reversible due to the use of different microcapsules in layers 104, 106, 108.

Figure 5:
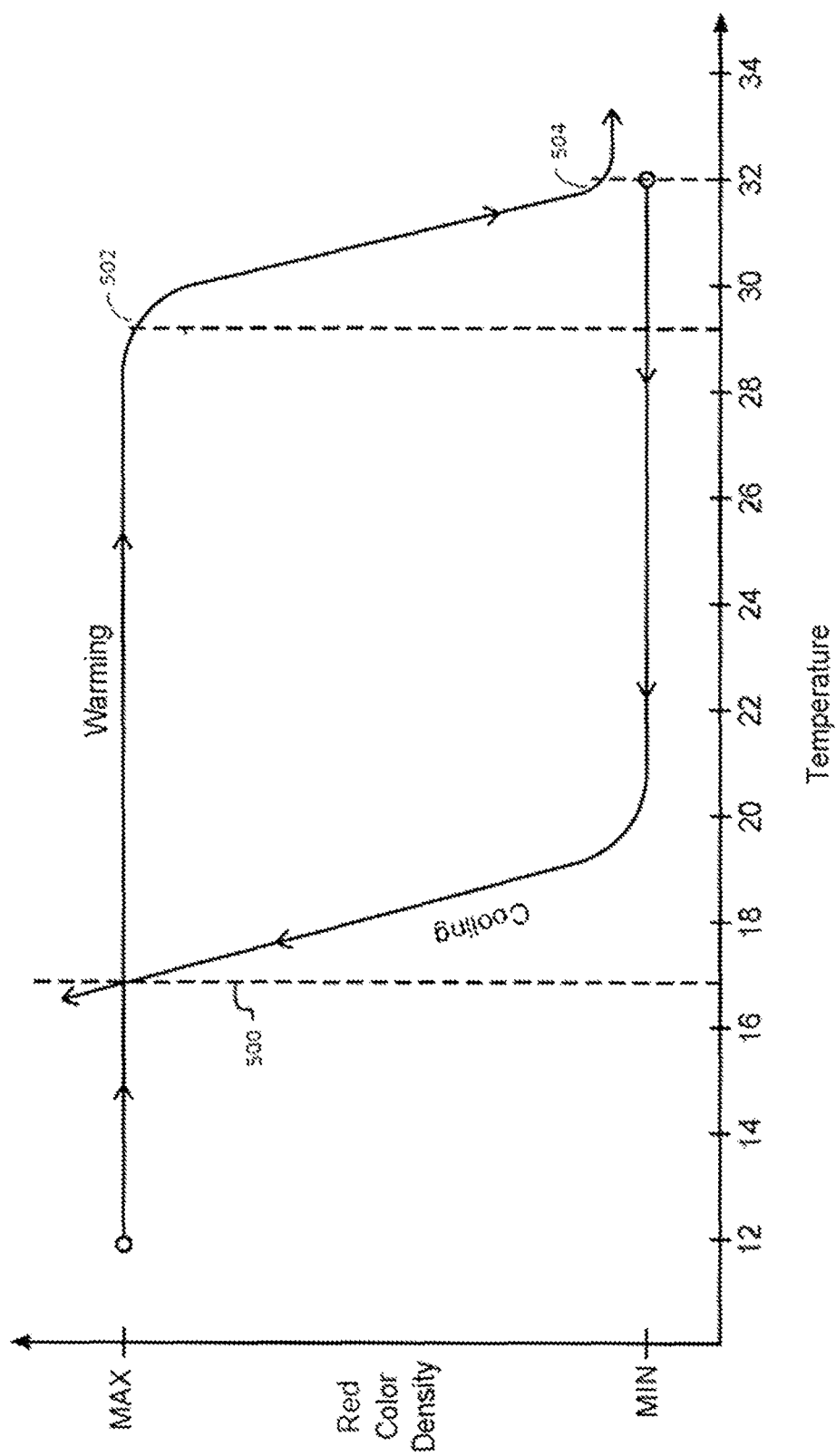
FIG. 5 shows a thermochromic hysteresis curve for a red pigment.
Figure 6:
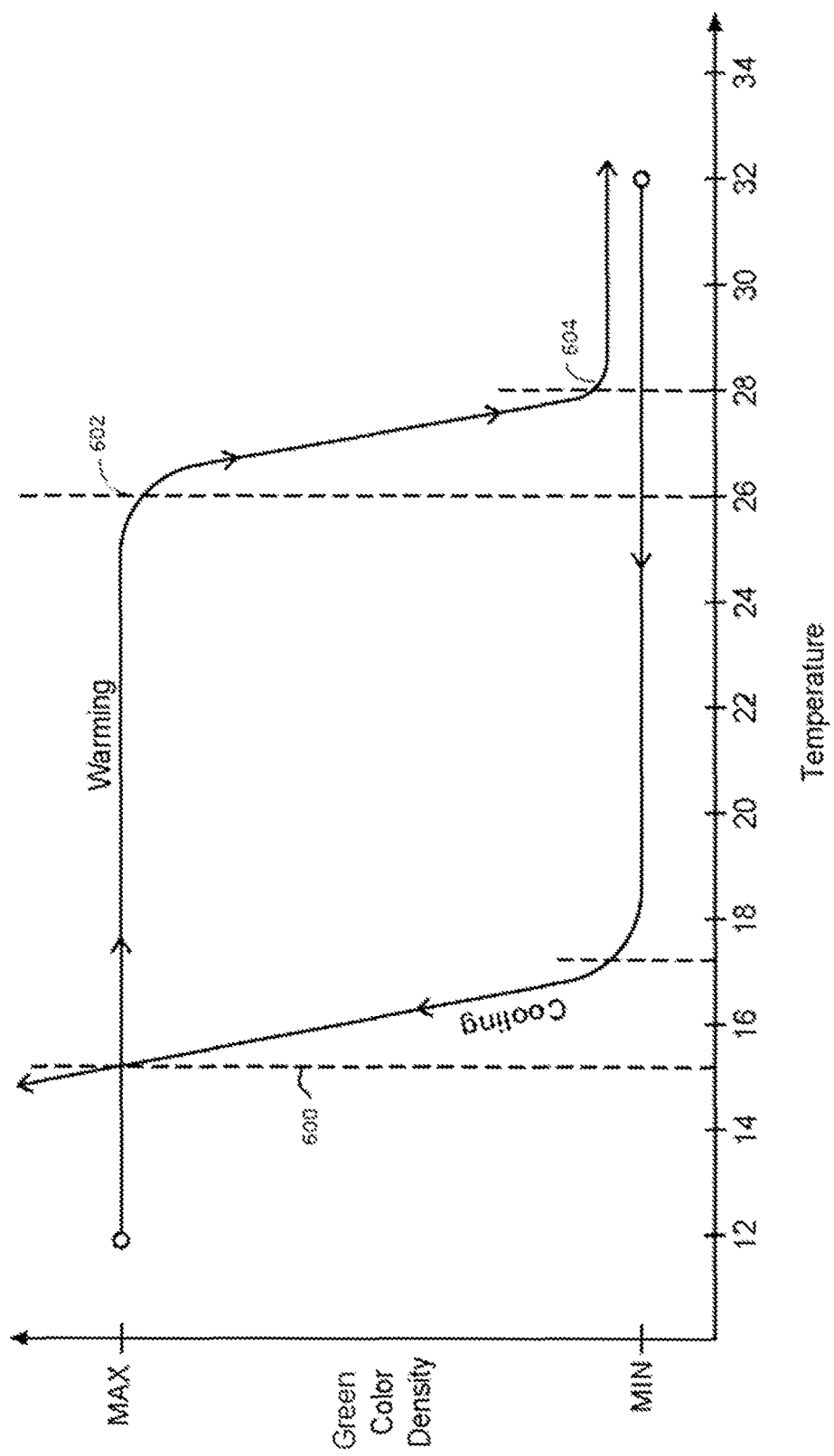
FIG. 6 shows a thermochromic hysteresis curve for a green pigment.
Figure 7:
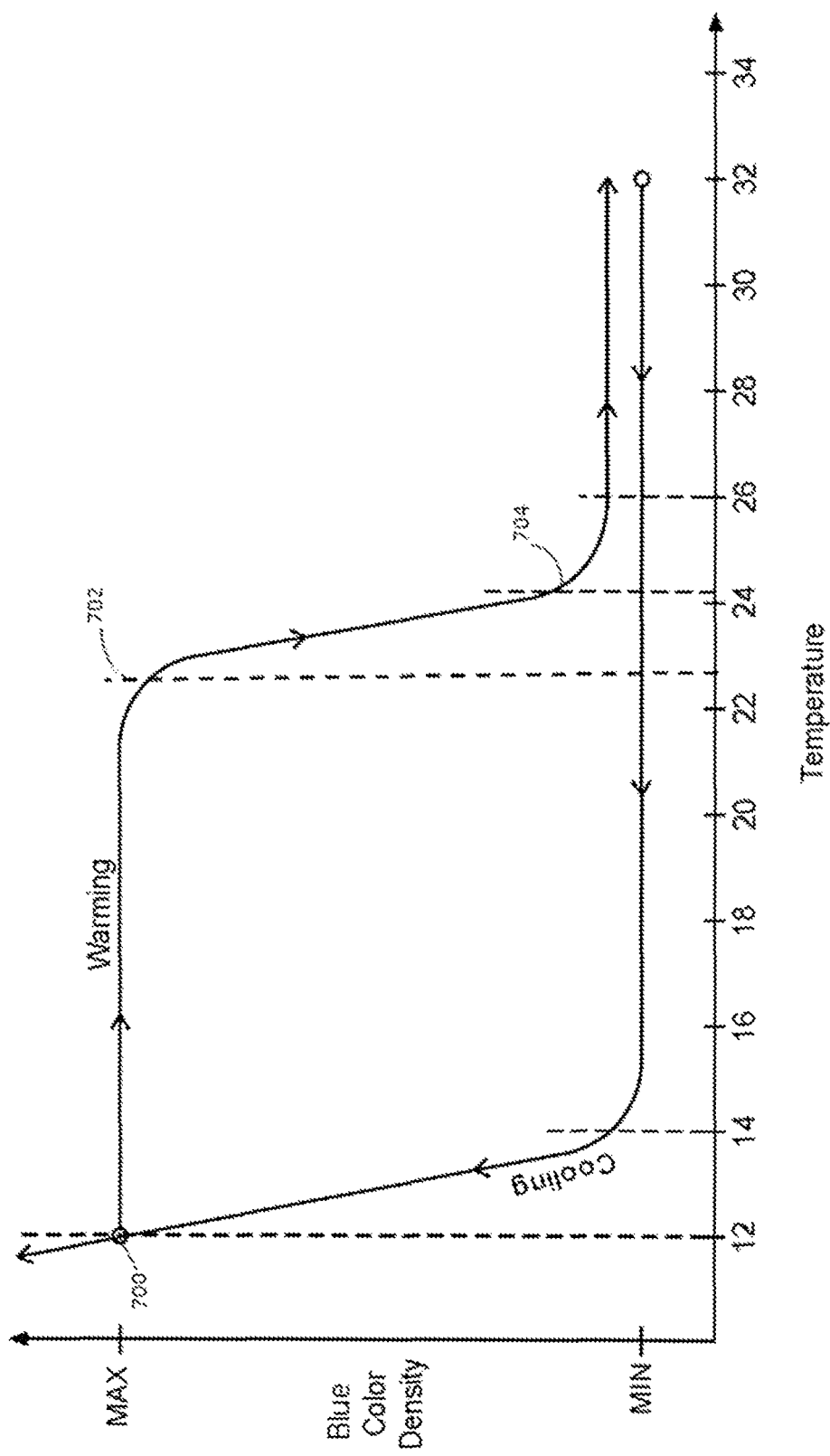
FIG. 7 shows a thermochromic hysteresis curve for a blue pigment.

FIGS. 5-7 show, by way of example, the thermochromic hysteresis behavior of thermochromic pigments that are formulated for use as described above. Taken altogether, FIGS. 5-7 show that thermochromic pigments with different thermal response profiles may be used in combination to provide variations in color that may differ depending upon the speed at which a heated object traverses surface 410 (see FIG. 4C).

FIG. 5 indicates a red pigment response having a color activation along the cooling curve from 20° C. to 16.5° C., with full color development 500 at 16.5° C. The developed color stays red along the warming cycle until color deactivation commences 502 at 29° C. and the color is fully deactivated 504 at 32° C.

FIG. 6 indicates a green pigment response having a color activation along the cooling curve from 17° C. to 15° C., with full color development 600 at 17° C. The developed color stays green along the warming cycle until color deactivation commences 602 at 26° C. and the color is fully deactivated 604 at 28° C.

FIG. 7 indicates a blue pigment response having a color activation along the cooling curve from 14° C. to 12° C., with full color development 700 at 12° C. The developed color stays blue along the warming cycle until color deactivation commences 702 at about 24° C. and the color is fully deactivated 704 at 26° C.

Liquid coating materials for use in forming layers 104, 106, 108 may be purchased on commercial order from Chromatic Technologies, Inc. of Colorado Springs, Colo. The color and thermal hysteresis behavior may be adjusted by design using the principles described below.

Thermochromic coatings useful in the layers 104, 106, 108 contain microcapsules, which encapsulate a thermochromic system mixed with a solvent. The thermochromic system has a material property of a thermally conditional hysteresis window that presents a thermal separation. These coatings may be improved according to the instrumentalities described herein by using a co-solvent that is combined with the thermochromic system. The thermochromic system may contain, for example, at least one chromatic organic compound and co-solvents.

One example of a thermochromic system includes a leuco dye having a lactone ring structure and a phenolic developer. Within the encapsulated thermochromic systems, complexes form between the dye and the weak acid developer that allow the lactone ring structure of the leuco dye to be opened. The nature of the complex is such that the hydroxyl groups of the phenolic developer interact with the open lactone ring structure forming a supra-molecular structure that orders the dyes and developers such that a color is formed. Color forms from this supra-molecular structure because the dye molecule in the ring open structure is cationic in nature and the molecule has extended conjugation allowing absorption in the visible spectrum thus producing a colored species. The color that is perceived by the eye is what visible light is not absorbed by the complex. The nature of the dye/developer complex depends on the molar ratio of dye and developer. The stability of the colored complex is determined by the affinity of the solvent for itself, the developer or the dye/developer complex. In a solid state, below the full color point, the dye/developer complex is stable. In the molten state, the solvent destabilizes the dye/developer complex and the equilibrium is more favorably shifted towards a developer/solvent complex. This happens at temperatures above the full color point because the dye/developer complex is disrupted and the extended conjugation of the π cloud electrons that allow for the absorption of visible light are destroyed.

The melting and crystallization profile of the solvent system determines the nature of the thermochromic system. The full color point of the system occurs when the maximum amount of dye is developed. In a crystallized solvent state, the dye/developer complex is favored where the dye and developer exist in a unique crystallized structure, often intercalating with one another to create an extended conjugated π system. In the molten state, the solvent(s), in excess, have enough kinetic energy to disrupt the stability of the dye/developer complex, and the thermochromic system becomes decolorized.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased.

Temperature changes in thermochromic systems are associated with color changes. If this change is plotted on a graph having axes of temperature and color, the curves do not align and are offset between the heating cycle and the cooling cycle. The entire color versus temperature curve has the form of a loop. Such a result shows that the color of a thermochromic system does not depend only on temperature, but also on the thermal history, i.e. whether the particular color was reached during heating or during cooling. This phenomenon is generally referred to as a hysteresis cycle and specifically referred to herein as color hysteresis or the hysteresis window. Decreasing the width of this hysteresis window to approximately zero would allow for a single value for the full color point and a single value for the clearing point. This would allow for a reliable color transition to be observed regardless of whether the system is being heated or cooled. Nonetheless, the concept decreasing separation across the hysteresis window is elusive in practice. Thus, it is an object of the present disclosure to provide thermochromic systems with a reduced hysteresis window achieved by shifting both the full color point and the clearing point or color deactivation temperature, for example.

Leuco Dyes

Leuco dyes most commonly used as color formers in thermochromic systems of the present disclosure include, but are not limited to, generally; spirolactones, fluorans, spiropyrans, and fulgides; and more specifically; diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives which can include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran,1,2-benzo-6-(N-ethyl-N-isoamylamino)fluoran; 2-(3-methoxy-4-dodecoxystyryl) quinoline; spiro[5H-(1) benzopyrano(2,3-d)pyrimidine-5,1' (3'H)isobenzofuran]-3'-one; 2-(diethylamino)-8-(diethylamino)-4-methyl-spiro[5H-(1)benzopyrano(2,3-d) pyrimidine-5,1'(3'H)isobenzofuran]-3'-one; 2-(di-n-butylamino)-8-(di-n-butylamino)-4-methyl-spiro[5H-(1) benzopyrano(2,3-d)pyrimidine-5,1'(3'H)isobenzofuran]-3'-one; 2-(di-n-butylamino)-8-(diethylamino)-4-methyl-spiro [5H-(1)benzopyrano(2,3-d)pyrimidine-5,1'(3'H) isobenzofuran]-3'-one; 2-(di-n-butylamino)-8(N-ethyl-N-isoamylamino)-4-methyl-spiro[5H-(1)benzopyrano(2,3-d) pyrimidine-5,1'(3'H)isobenzofuran]-3'-one; and 2-(di-n-butylamino)-8-(di-n-butylamino)-4-phenyl and trisubstituted pyridines.

Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol; 2-naphthol; 2,2 bis(2-hydroxy-5-biphenylyl)propane; 2,2-bis(3-cyclohexyl-4-hydroxy)propane; 2,2-bis(3-sec-butyl-4-hydroxyphenyl) propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene) diphenol; 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyl)diphenol; alpha,alpha'-bis (4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris(4-hydroxyphenypethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl) cyclohexane; 1,3-bis[2-(4-hydroxyphenyl)-2-propyl] benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol 4,4'-(2-hydroxybenzylidene)bis(2,3,6-trimethylphenol); 4,4'-biphenol; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl) sulfidem; bis(4-hydroxyphenyl) sulfone methyl 4-hydroxybenzoate; resorcinol; tetrabromobisphenol A; 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo. Solvents The best solvents to use within the thermochromic system are those that have low reactivity, have a relatively large molecular weight (i.e. over 100), and which are relatively non-polar. Very low molecular weight aldehydes, ketones, diols and aromatic compounds should not be used as solvents within the thermochromic system.

Thermochromic coatings disclosed herein use a co-solvent that is combined with the thermochromic system. This material may be provided in an effective amount to reduce the thermal separation in the overall coatng to a level less than eighty percent of separation that would otherwise occur if the material were not added. This effective amount may range, for example from the 12% to 15% by weight of the composition.

The addition of a co-solvent with a significantly higher melting point than the other dramatically changes the melting properties of both the solvents. By mixing two solvents that have certain properties, a blend can be achieved that possesses a eutectic melting point. The melting point of a eutectic blend is lower than the melting point of either of the co-solvents alone and the melting point is sharper, occurring over a smaller range of temperatures. The degree of the destabilization of the dye/developer complex can be determined by the choice of solvents. By creating unique eutectic blends, both the clearing point and the full color point can be altered simultaneously. The degree of hysteresis is then shifted in both directions simultaneously as the sharpness of the melting point is increased. Copending application Ser. No. 13/363,070 filed Jan. 31, 2012 discloses thermochromic systems with controlled hysteresis, and is hereby incorporated by reference to the same extent as though fully replicated herein. According to the instrumentalities described therein, the microencapsulate pigments may be formulated to have color transition temperatures across a hysteresis window of less than five degrees centigrade or more than 60 or 80 degrees centigrade.

Properties of at least one of the co-solvents used in the present disclosure include having a long fatty tail of between 12 and 24 carbons and possessing a melting point that is about 70° C. to about 200° C. greater than the co-solvent partner. The co-solvents are preferably also completely miscible at any ratio.

Solvents and/or co-solvents used in thermochromic generally may include, but are not limited to, sulfides, ethers, ketones, esters, alcohols, and acid amides. These solvents can be used alone or in mixtures of 2 or more. Examples of the sulfides include: di-n-octyl sulfide; di-n-nonyl sulfide; di-n-decyl sulfide; di-n-dodecyl sulfide; di-n-tetradecyl sulfide; di-n-hexadecyl sulfide; di-n-octadecyl sulfide; octyl dodecyl sulfide; diphenyl sulfide; dibenzyl sulfide; ditolyl sulfide; diethylphenyl sulfide; dinaphthyl sulfide; 4,4'-dichlorodiphenyl sulfide; and 2,4,5,4'tetrachlorodiphenyl sulfide. Examples of the ethers include: aliphatic ethers having 10 or more carbon atoms, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether; alicyclic ethers such as s-trioxane; and aromatic ethers such as phenylether, benzyl phenyl ether, dibenzyl ether, di-p-tolyl ether, 1-methoxynaphthalene, and 3,4, 5trimethoxytoluene.

Examples of ketone solvents include: aliphatic ketones having 10 or more carbon atoms, such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone; aryl alkyl ketones having 12 to 24 carbon atoms, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone; aryl aryl ketones such as benzophenone, benzyl phenyl ketone, and dibenzyl ketone; and alicyclic ketones such as cyclooctanone, cyclododecanone, cyclopentadecanone, and 4-tort-butylcyclohexanone, ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, stearyl behenate 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl sebacate, 1,18-dineopentyloctadecylmethylenedicarboxylate, ethylene glycol dimyristate, propylene glycol dilaurate, propylene glycol distearate, hexylene glycol dipalmitate, 1,5-pentanediol dimyristate, 1,2,6-hexanetriol trimyristate, 1,4-cyclohexanediol didecanoate, 1,4-cyclohexanedimethanol dimyristate, xylene glycol dicaprate, and xylene glycol distearate.

Ester solvents can be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms, cetyl butyrate, stearyl butyrate, and behenyl butyrate including 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 2-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl-2-fluoromyristate, cetyl butyrate, stearyl butyrate, and behenyl butyrate.

Examples of the alcohol solvents include monohydric aliphatic saturated alcohols such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, behenyl alcohol and docosyl alcohol; aliphatic unsaturated alcohols such as allyl alcohol and oleyl alcohol, alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol. Examples of the acid amides include acetamide, propionamide, butyramide, capronamide, caprylamide, capric amide, lauramide, myristamide, palmitamide, stearamide, behenamide, oleamide, erucamide, benzamide, capronanilide, caprylanilide, capric anilide, lauranilide, myristanilide, palmitanilide, stearanilide, behenanilide, oleanilide, erucanilide, N-methylcapronamide, N-methylcaprylamide, N-methyl (capric amide), N-methyllauramide, N-methylmyristamide, N-methylpalmitamide, N-methylstearamide, N-methylbehenamide, N-methyloleamide, N-methylerucamide, N-ethyllauramide, N-ethylmyristamide, N-ethylpalmitamide, N-ethylstearamide, N-ethyloleamide, N-butyllauramide, N-butylmyristamide, N-butylpalmitamide, N-butylstearamide, N-butyloleamide, N-octyllauramide, N-octylmyristamide, N-octylpalmitamide, N-octylstearamide, N-octyloleamide, N-dodecyllauramide, N-dodecylmyristamide, N-dodecylpalmitamide, N-dodecylstearamide, N-dodecyloleamide, dilauroylamine, dimyristoylamine, dipalmitoylamine, distearoylamine, dioleoylamine, trilauroylamine, trimyristoylamine, tripalmitoylamine, tristearoylamine, trioleoylamine, succinamide, adipamide, glutaramide, malonamide, azelamide, maleamide, N-methylsuccinamide, N-methyladipamide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-butylmalonamide, N-octyladipamide, and N-dodecyladipamide.

Among these solvents, it has been discovered that certain solvents have the effect of reducing the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent is selected from the group consisting of derivatives of mysristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

Light Stabilizers

Thermochromic coatings containing leuco dyes are available for all major coating types such as water-based, ultraviolet cured and epoxy. The properties of these coatings differ from process coatings. For example, most thermochromic coatings contain the thermochromic systems as microcapsules, which are not inert and insoluble as are ordinary process pigments. The size of the microcapsules containing the thermochromic systems ranges typically between 3-5 µm which is more than 10-times larger than regular pigment particles found in most coatings. The post-print functionality of thermochromic coatings can be adversely affected by ultraviolet light, temperatures in excess of 140° C. and aggressive solvents. The lifetime of these coatings is sometimes very limited because of the degradation caused by exposure to ultraviolet light from sunlight.

In other instances, additives used to fortify the encapsulated thermochromic systems by imparting a resistance to degradation by ultraviolet light by have a dual functionality of also reducing the width of separation over the hysteresis window. Light stabilizers are additives which prevent degradation of a product due to exposure to ultraviolet radiation. Examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, hemotrizinol, benzophenones 1-12, dioxybenzone, drometrizole trisiloxane, iscotrizinol, octocrylene, oxybenzone, sulisobenzone , bisoctrizole, titanium dioxide and zinc oxide.

Careful preparation of encapsulated reversible thermochromic material enhances coating stability in the presence of low molecular weight polar solvents that are known to adversely affect thermochromic behavior. One skilled in the art of microencapsulation can utilize well-known processes to enhance the stability of the microcapsule. For example, it is understood that increasing the cross linking density will reduce the permeability of the capsule wall, and so also reduces the deleterious effects of low molecular weight solvents. It is also commonly understood that, under certain conditions, weak acids with a pKa greater than about 2 may catalyze microcapsule wall polymerization and increase the resulting cross linking density. It is presently the case that using formic acid as a catalyst enhances solvent stability of blue thermochromic microcapsules in the presence of low molecular weight ketones, diols, and aldehydes at room temperature. Further, it is well understood that increasing the diameter of the thermochromic microcapsule can result in enhanced solvent stability.

The selection of material for use as the non-polar solvent for the thermochromic dye and color developer that is encapsulated within the thermochromic pigment determines the temperature at which color change is observed. For example, changing the solvent from a single component to a two component solvent system can shift the temperature at which full color is perceived almost 7° C. from just under 19° C. to 12° C. The present disclosure shows how to apply this knowledge in preparing resin-based vehicle coatings for use in can and coil coatings with full color temperatures, i.e., the temperature at which maximum color intensity is observed, as low as −5° C. and as high as 65° C. No adverse effects on the physical properties of the resulting coating were observed as the full color temperature was changed over the above range by the use of different straight chain alkyl esters, alcohols, ketones or amides.

Thermochromic materials including encapsulated thermochromic systems with a variety of color properties may be purchased on commercial order from such companies as Chromatic Technologies, Inc., of Colorado Springs, Colo.

Control over observed color intensity is demonstrated in several ways, generally by providing increased amounts of pigment. For a typical coating, material thickness ranges from 1 mg/in2 to 6 mg/in2. Very intense color is observed for coatings with thickness greater than about 3 mg/in2. Increasing thermochromic pigment solids can also result in a more intense observed color even when coating thickness is decreased. However, dried film properties such as flexibility and toughness may be compromised if too much thermochromic pigment is incorporated. The optimal range of thermochromic pigment solids is within 5 to 40% by weight of the coating.

Encapsulation Process for Non-Frangible Capsules

Nearly all thermochromic systems require encapsulation for protection. As is known in the art, the most common process for encapsulation is interfacial polymerization. During interfacial polymerization the internal phase (material inside the capsule), external phase (wall material of the capsule) and water are combined through high-speed mixing. By controlling all the temperature, pH, concentrations, and mixing speed precisely, the external phase will surround the internal phase droplet while crosslinking with itself. Usually the capsules are between 3-5 µm or smaller. Such small sizes of capsules are referred to as microcapsules and the thermochromic system within the microcapsules are microencapsulated. Microencapsulation allows thermochromic systems to be used in wide range of materials and products. The size of the microcapsules requires some adjustments to suit particular printing and manufacturing processes.

The size distribution of microcapsules can range from as much as 0.2 µm to 100 µm. Further example techniques of physical microencapsulation include but are not limited to pan coating, air suspension coating, centrifugal extrusion, vibration nozzle, and spray drying. Examples of chemical microencapsulation techniques include but are not limited to interfacial polymerization, in-situ polymerization, and matrix polymerization. Example polymers used in the preferred chemical microencapsulation include but are not limited to polyester, polyurethane, polyureas, urea-formaldehyde, epoxy, melamine-formaldehyde, polyethylene, polyisocyanates, polystyrene, polyamides, and polysilanes.

The capsule isolates the thermochromic system from the environment, but the barrier that the capsule provides is itself soluble to certain solvents. Therefore, the microcapsule constituents interact with the environment to some extent. The solubility parameter describes how much a material will swell in the presence of different solvents. This swelling will directly impact the characteristics of the reaction potential within the capsule, as well as potentially making the capsule more permeable, both of which will likely adversely affect the thermochromic system. Solvents in which the microcapsules are exposed to are chosen so as not to destroy, or affect, the thermochromic system within.

The capsule is hard, thermally stable and relatively impermeable. The infiltration of compounds through the capsule are stopped or slowed to the point that the characteristics of the dye are not affected. The pollution of the thermochromic system within the capsule by solvents from the environment affects the shelf life of the thermochromic system. Therefore, the formulation of the applied thermochromic system, as a coating for example, should be carefully considered.

In an embodiment of the present disclosure, capsules are made from urea formaldehyde. One technique used to produce the encapsulated thermochromic systems is to combine water, dye, oil, and urea formaldehyde and mix to create a very fine emulsification. Because of the properties of the compounds, the oil and dye end up on the inside of the capsule and the water ends up on the outside, with the urea formaldehyde making up the capsule itself. The capsule can then be thermo-set, similar to other resins, such as formica.

The thermo-set substance is very hard and will not break down, even at temperatures higher than the encapsulated thermochromic system is designed to be exposed to. The urea formaldehyde capsule is almost entirely insoluble in most solvents, but it is permeable to certain solvents that might destroy the ability of the thermochromic system to color and decolorize throughout a temperature range.

The extent to which capsules will react with their environment is influenced by the pH of the surrounding medium, the permeability of the capsule, the polarity and reactivity of compounds in the medium, and the solubility of the capsule. Preferred media used in formulating encapsulated thermochromic system are engineered to reduce the reactivity between that medium and the capsules to a low enough level that the reactivity will not influence the characteristics of the dye for an extended period of time.

Highly polar solvent molecules, with the exception of water, often interact more with the leuco dye than with the capsule shell and other non-polar molecules of the thermochromic system. Therefore, polar solvents that are able to cross the capsule barrier should, in general, be eliminated from the medium within which the encapsulated thermochromic system is formulated.

Aqueous media that the encapsulated thermochromic systems are placed within should have a narrow pH range from about 6.5 to about 7.5. When an encapsulated thermochromic system is added to a formulation that has a pH outside this range, often the thermochromic properties of the system are destroyed. This is an irreversible effect.

One aspect of the present disclosure is for a method of improving the formulations of the thermochromic system by removing any aldehydes, ketones, and diols and replacing them with solvents which do not adversely affect the thermochromic system. Solvents having a large molecular weight (i.e. greater than 100) generally are compatible with the thermochromic systems. The acid content of the system is preferably adjusted to an acid number below 20 or preferably adjusted to be neutral, about 6.5-7.5. Implementing these solvent parameters for use in the thermochromic system will preserve the reversible coloration ability of the leuco dyes.

Formulations for thermochromic systems are engineered with all the considerations previously mentioned. The examples below describe a thennochromic system with excellent color density, low residual color, narrow temperature ranges between full color and clearing point, and a narrow hysteresis window. The full color point and the clearing point are determined by visual inspection of the thermochromic system at a range of temperatures. The difference in temperature between the maxima of color change during the cooling cycle and the heating cycle is used to calculate hysteresis.

Vehicle

Physical properties of the finished coating can be significantly affected by the selection of resin to be used. When no resin is used in formulating a reversible thermochromic coating, a matte finish is achieved that is able to be formed into can ends, tabs, caps and/or other closures. While this result may be desired, the inclusion of a low viscosity, relatively low molecular weight resin, monomer, oligomer, polymer, or combination thereof, can enhance gloss and affect other physical film properties such as hardness, flexibility and chemical resistance. The resin is designed to supplement the total solids deposited on the substrate, thus impacting the physical properties of the dried film. Any resin material, monomer, oligomer, polymer, or combination thereof that can be polymerized into the commercially available can and coil coating material is suitable for inclusion in the formulation of the current reversible thermochromic can and coil coating. Acceptable classes of resins include, but are not limited to polyester, urethane, acrylic acid and acrylate, or other types of resin systems with suitably high solids content.

Adjusting the Acid Content

Water-based coatings are pH adjusted prior to addition of thermochromic pigment. As mentioned above, the pH should be neutral unless observation indicates that a different pH is required. To achieve the correct pH, one uses a good proton donor or acceptor, depending on whether the pH is to be adjusted up or down. To lower the pH, sulfuric acid is used, to raise it, the best proton acceptor so far is KOH. These two chemicals are very effective and do not seem to impart undesirable characteristics to the medium. The most effective pH is about 7.0, however, some tolerance has been noted between 6.0 and 8.0. A pH below 6.0 and above 8.0 has almost always immediately destroyed the pigment.

The acid value is defined as the number of milligrams of a 0.1 N KOH solution required to neutralize the alkali reactive groups in 1 gram of material under the conditions of ASTM Test Method D-1639-70. It is not yet fully understood how non-aqueous substances containing acid affect the thermochromic, but high acid number substances have inactivated the thermochromic pigments. Generally, the lower the acid number the better. To date coating formulations with an acid value below 20 and not including the harmful solvents described above have worked well. Some higher acid value formulations may be possible but generally it is best to use vehicle ingredients with low acid numbers or to adjust the acid value by adding an alkali substance. The greatest benefit of a neutral or low acid value vehicle will be increased shelf life. Buffers have been used historically in offset coating formulations to minimize the effects of the fountain solution on pigment particles. This is one possible solution to the potential acidity problem of the varnishes. One ingredient often used as a buffer is cream of tartar. A dispersion of cream of tartar and linseed oil can be incorporated into the coating. The net effect is that the pigments in the coating are protected from the acidic fountain solution.

Coating Formulations

The encapsulated thermochromic systems of the present disclosure may be referred to as pigments. In order to add normal pigment to coating, dye, or lacquer, the pigment itself is ground into the base. This disperses the pigment throughout the base. The addition of more pigment intensifies the color. Since the pigment often has a very intense color, it is sometimes acceptable for only about 10% of the final coating to be made up of normal pigments.

A base for a coating formulation using encapsulated thermochromic systems of the present disclosure may be developed using off the shelf ingredients. The coating will incorporate, where possible, and he compatible with different coating types and solvents with molecular weights larger than 100 while avoiding aldehydes, diols, ketones, and, in general, aromatic compounds. Important considerations with respect to the ingredients within the coating vehicle are the reactivity of the ingredients with the encapsulated thermochromic system.

Unwanted interactions between media and the encapsulated thermochromic systems can occur between compounds found in coating formulations. The long alkyl chains of many of the compounds found in coating vehicles may have reactive portions that can fit through the pores of the capsule and interact with the inner phase and denature it through this interaction. Since the behavior of the thermochromic system is related to the shape and the location of its molecules at given temperatures, disrupting these structures could have a large impact on the characteristics of the thermochromic system. Even molecules that cannot fit through the capsule pores may have reactive portions that could protrude into the capsule and thereby influence the color transition of the thermochromic system within the capsule. Therefore, mineral spirits, ketones, diols, and aldehydes are preferably minimized in any medium in which the encapsulated are also preferably avoided. If these compounds are substantially reduced or eliminated the thermochromic systems will perform better and have a longer shelf life.

Another important step in using the encapsulated thermochromic systems of the present disclosure in coating formulations is to adjust the pH or lower the acid value of the coating base before the thermochromic system is added. This can be done by ensuring that each individual component of the base is at the correct pH or acid value or by simply adding a proton donor or proton acceptor to the base itself prior to adding the thermochromic system. The appropriate specific pH is generally neutral, or 7.0. The pH will vary between 6.0 and 8.0 depending on the coating type and the color and batch of the thermochromic system.

Once a slurry and the base have been properly prepared, they are combined. The method of stirring should be low speed with non-metal stir blades. Other additives may be incorporated to keep the thermochromic system suspended. The coating should be stored at room temperature.

Most thermochromic pigments undergo a color change from a specific color to colorless. Therefore, layers of background colors can be provided under thermochromic layers that will only be seen when the thermochromic pigment changes to colorless. If an undercoat of yellow is applied to the substrate and then a layer containing blue thermochromic pigment is applied the color will appear to change from green to yellow, when what is really happening is that the blue is changing to colorless.

The substrates that the thermochromic coatings are printed upon are preferably neutral in pH, and should not impart any chemicals to the capsule that will have a deleterious effect on it.

Thermochromic coatings contain, in combination, a vehicle and a pigment including thermochromic microcapsules. The thermochromic microcapsules are preferably present in an amount ranging from 1% to 50% of the coating by weight on a sliding scale relative to other pigments. The vehicle contains a solvent that is preferably present in an amount ranging from 25% to 75% by weight of the coating.

The aqueous pigment slurries have particle sizes less than 5 microns and when drawn-down on coating test paper and dried, the pigment coating shows reversible thermochromic properties when cooled to the solidification point of the fatty ester, alcohol, amide, or a blend designed to obtain a specific temperature for full color formation. Such pigments can be designed to have a range of temperature for transition from full absorption temperature (full absorption color or UVA absorption point) to no color or no UVA absorption temperature (clearing point) of 2-7° C. The pigments are very useful for manufacture of coating, and injected molded plastic products by spray drying prior to formulation into coating compositions or extrusion into thermoplastic polymers to produce pellet concentrates for manufacture of injection molded thermochromic plastic products such as cups, cup lids, jars, straws, stirrers, container sleeves, shrink wrap labels. For example, thermochromic compositions were identified that permit generation of high quality saturated photographic quality yellow color that is very useful to formulate new orange, red, and green colors by mixing with magenta and/or cyan thermochromic pigments or by initial co-encapsulation of the yellow leuco dye with magenta and/or cyan leuco dyes and appropriate color developers during the pigment manufacture. Alternatively leuco pigments were identified that can change from absorption mainly in the region from 280 to 350 nm to absorption mainly from 350 to 400 nm.

EXAMPLE 1

Pigment Formulations

The internal phase chemistry for the microcapsules has been tested with the following solvents that to engineer the temperature profile and thermal memory:

| Methyl Palmitate | FC 12-13 | CP 23-27 |
| Tetradecanol | FC 17-19 | CP 29-33 |
| Lauryl Laurate | FC 15-17 | CP 25-29 |

These internal phase esters or alcohols have been tested with standard fluoran and phthalide dyes using BHPMP as a chemical developer. The exact temperature profile and thermal memory is specific to the dye, or mixture of dyes. The dyes and developer may be co-encapsulated or separately encapsulated to achieve a specific color with the desired temperature profile and thermal memory. The ratio of the dye: developer may be for example 1:1 to 1:4 in order to achieve desirable color density with minimal residual.

The following dyes may be microencapsulated with Developer CAS# 6807-17-6 (BHPMP) for various color formulations as described above.

| Aqua dye | CAS# 132467-74-4 |
| Blue-63 dye | CAS# 69898-40-4 |
| Black XV | CAS# 36431-22-8 |
| Red-40 dye | CAS# 50292-91-6 |
| Green dye | CAS# 34372-72-0 |
| Orange dye | CAS# 21934-68-9 |

The internal phase as described above may be microencapsulated using conventional urea-formaldehyde processes to form thermochromic pigments.

EXAMPLE 2

Coating Formulations

Any of the thermochromic pigments prepared according to Example 1 above may be mixed with synthetic resins to form liquid coatings for use as precursors in forming the layers 210-218. Various examples of this chemistry are as follows:

In one embodiment, a thermochromic coating formulation includes:

| Ingredient | Weight Percent of Coating |
|---|---|
| Pigment* | 1% to 40% |
| Vehicle | |
| Polymerizable resin | 5% to 30% |
| Dispersing agent | 0% to 5% |

-continued

| Ingredient | Weight Percent of Coating |
|---|---|
| Solvent | 0% to 50% |
| Curing agent | 0% to 25% |
| Wax | 0% to 5% |

*Assessed by solids content upon complete drying of pigment capsules, but does not need to be dried and may be mixed as a slurry.

In one aspect, a reversible thermochromic coating for use in can and coil coatings contains a reversible thermochromic pigment in an amount from 1% to 50% by weight of the coating, and a vehicle forming the balance of the coating. The vehicle includes a resin selected from the group consisting of epoxy, polyester, urethane, acrylic acid and acrylate resins, and combinations thereof. Commercially available thermochromic pigments may be readily obtained in a variety of colors demonstrating color transition temperatures from about 5° C. and up to about 65° C. A range of color formulations may be made by mixing the pigment to include one or more of the following reversible thermochromic colors: yellow, magenta, cyan, and black. These may be further mixed to include other dyes or solid pigments that are non-thermochromic in nature. The pigment may change from a colorless state to a colored state upon cooling to the reactive temperature, or to a colored state upon heating to the reactive temperature. It is preferred that the microcapsules are formed of urea-formaldehyde or melamine-formaldehyde that is acid catalyzed to enhance the inherent stability in polar, low molecular weight solvents having a molecular weight of about less than 100 g/mol.

When premised using a nonpolar solvent, the coatings can demonstrate shelf stability exceeding 14 or 45 days when stored at about 20° C. Some coating formulations demonstrate shelf stability in excess of one year.

The curing agent is generally compatible with the resin for this purpose and may be, for example, a latent blocked amine to initiate a polymerization reaction upon heating.

The coating is preferably roller-coated onto coil stock aluminum or steel and the roll stock aluminum is subsequently formed into one or more beverage can components. These components may be selected from the group consisting of beverage can ends, beverage can tabs, bottle caps, and/or beverage container closures. The aluminum is preferably an alloy that is commonly used in canning operations, such as aluminum alloy 5182-H48. The coating process preferably occurs in one or more coats to yield a dried film with a thickness ranging from 1 mg/in$^2$ up to 5.5 mg/in$^2$.

EXAMPLE 3

Two Part Coating

Part A (30% by weight of coating)
Thermochromic pigment (any color)*
Part B (70% by weight of coating)
Clear Coating (an epoxy coating available from Watson Standard of Pittsburgh, Pa.)

* This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.

EXAMPLE 4

Two Part Coating

Part A (60% by weight of coating)
45% Thermochromic Pigment (any color)*
50% Epoxy resin (for example Epon 863 available from Lawter of LaVergne, Tenn.)
3.3% Dispersing aid (for example Disperbyk 2025 available from Byk of Wallingford, Conn.)
1.7% Curing agent (for example Ancamine 2458 available from Air Products of Allentown, Pa.)
Part B (40% by weight of coating)
85% Clear Coating (an epoxy coating available from Watson Standard of Pittsburgh, Pa.)
15% Solvent to reduce viscosity (for example, butyl carbitol acetate available from Lawter of LaVergne, Tenn.)

* This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.

EXAMPLE 5

One Part Coating

20% (w/w) Thermochromic Pigment (any color)* 13% Polyester resin (for example, Decotherm 290 available from Lawter of LaVergne, Tenn.)
0.5% (w/w) Dispersing aid (for example, Byk 370 available from Byk of Wallingford, Conn.)
7% (w/w) Curing agent 1 (for example, Cymel 328 available from Cytec Industries of Woodland Park, N.J.)
1.5% (w/w) Curing agent 2 (for example, imidazole available from Aldrich of St. Louis, Mo.)
2% (w/w) Wax (for example, Fluoron 735 available from Lawter of LaVergne, Tenn.)
30% (w/w) Solvent (for example, ethyl-3-ethoxypropionate available from Univar of Redmond, Wash.)
26% (w/w) Clear Coating (an epoxy coating available from Watson Standard of Pittsburgh, Pa.)

EXAMPLE 6

One Part Coating

15% (w/w) Thermochromic Pigment (any color)*
10% (w/w) Resin (for example, Epon 896 available from Lawter of LaVergne, Tenn.)
1.5% (w/w) Dispersing aid (for example, Disperbyk 112 available from Byk of Wallingford, Conn.)
0.5% (w/w) Curing agent 1 (for example, Nacure 2500 available from King Industries of Norwalk, Conn.)
4% (w/w) Curing agent 2 (for example, Cymel 325 available from Cytec Industries of Woodland Park, N.J.)
1.5% (wlw) Wax-0.5 wt % (for example, Ultrapoly 211A available from Lawter of LaVergne, Tenn.)
5% (w/w) Solvent 1 (for example, Heloxy Modifier 62 available from Lawter of LaVergne, Tenn.)
21.5% (w/w) solvent 2 (for example, ethyl-3-ethoxypropionate available from Univar of Redmond, Wash.)
41% (w/w) Clear Coating (an epoxy coating available from Watson Standard of Pittsburgh, Pa.)

Having described the invention in detail and by reference to preferred embodiments thereof, it will be apparent that modifications and variations are possible without departing from the scope of the invention defined in the appended claims.

We claim:

1. A method of making a tape, said method comprising:
    providing an elongate substrate having opposing first and second faces;
    encapsulating both a colorant and a solvent within first pressure-rupturable microcapsules, said colorant and said solvent providing a first color;
    providing a developer;
    combining said first pressure-rupturable microcapsules and said developer to provide a coating composition;
    coating said first face of said elongate substrate with said coating composition; and
    coupling an adhesive layer to said first face of said elongate substrate;
    wherein upon rupture of said first pressure-rupturable microcapsules, said colorant and said solvent combine with said developer to generate a color change from said first color to a second color.

2. The method of claim 1 further comprising:
    encapsulating said developer within second pressure-rupturable microcapsules;
    wherein upon rupture of said first and second pressure-rupturable microcapsules, said colorant and said solvent combine with said developer to generate said color change from said first color to said second color.

3. The method of claim 2, wherein said color change is irreversible.

4. The method of claim 1, further comprising:
    formulating said colorant as a thermochromic compound;
    wherein upon rupture of said first pressure-rupturable microcapsules, said thermochromic compound and said solvent combine with said developer to provide a thermochromic system which exhibits said color change from said first color to said second color upon a change in temperature.

5. The method of claim 4, wherein said first color is colorless.

6. The method of claim 4, wherein said second color is colorless.

7. The method of claim 4, further comprising:
    encapsulating said developer within second pressure-rupturable microcapsules;
    wherein upon rupture of said first and second pressure-rupturable microcapsules, said colorant and said solvent combine with said developer to generate said color change from said first color to said second color.

8. The method of claim 7, wherein said color change is irreversible.

9. The method of claim 7, wherein said color change is reversible.

10. The method of claim 9, wherein said color change reverses upon a decrease in said temperature.

11. The method of claim 7, further comprising combining said first and second pressure-rupturable microcapsules in a ratio having a range of between about 1:1 to about 1:20 weight/weight.

12. The method of claim 7, further comprising formulating said thermochromic compound as a leuco dye.

13. The method of claim 7, further comprising formulating said first and second pressure-rupturable microcapsules to have a mean diameter of less than about 5 micrometers.

14. The method of claim 7, further comprising formulating said first and second pressure-rupturable microcapsules to have a mean diameter of less than about 4 micrometers.

15. The method of claim 7, further comprising formulating said first and second pressure-rupturable microcapsules to have a mean diameter of less than about 3 micrometers.

16. The method of claim 7, further comprising forming said elongate substrate from a material selected from the group consisting of: paper, plastic, and combinations thereof.

* * * * *